United States Patent [19]
Ibragimov et al.

[11] 3,867,956

[45] Feb. 25, 1975

[54] SAFETY VALVE

[76] Inventors: Enver Seifullaevich Ibragimov, 14 Zavokzalneya ulitsa 18, kv. 68, blok 7; Rudolf Ervandovich Gazarov, ulitsa Gorkogo 5, kv. 6, both of Baku, U.S.S.R.

[22] Filed: Apr. 30, 1973

[21] Appl. No.: 355,537

[52] U.S. Cl. .................. 137/269, 137/495, 137/509
[51] Int. Cl. ............................................ F16k 11/00
[58] Field of Search ........... 137/269, 271, 495, 474, 137/509

[56] References Cited
UNITED STATES PATENTS

| | | | |
|---|---|---|---|
| 881,848 | 3/1908 | Day | 137/509 |
| 1,177,029 | 3/1916 | Gamble | 137/509 X |
| 1,616,863 | 2/1927 | Linaker | 137/509 X |
| 3,259,919 | 7/1966 | Cipriano | 137/271 X |
| 3,593,742 | 7/1971 | Taylor | 137/269 X |
| 3,754,567 | 8/1973 | Whitten | 137/509 |

*Primary Examiner*—Harold W. Weakley
*Attorney, Agent, or Firm*—Holman & Stern

[57] ABSTRACT

A safety valve is provided with a movable element responsive to changes in fluid pressure and defined by a set of spring-loaded plungers. The total area of the plunger end faces constitutes the active area of the movable element. When moving under the effect of fluid pressure, the movable element unseats a shut-off member kinematically connected therewith.

3 Claims, 2 Drawing Figures

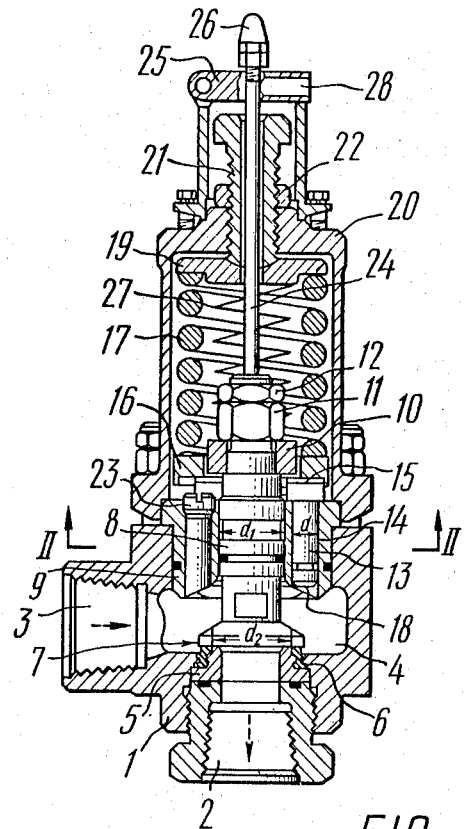
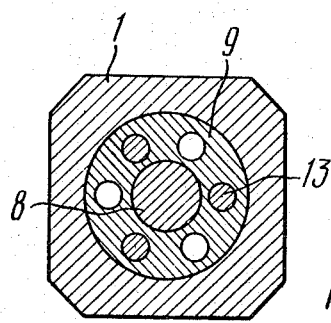

SAFETY VALVE

BACKGROUND OF THE INVENTION

This invention relates to safety devices designed to protect hydraulic systems from overpressure.

The invention can be used in oil, chemical and other industries, preferably in the high-pressure handling of fluids containing abrasive substances. It can be employed with particular advantage in the delivery lines of mobile oilfield pumping units in such applications as hydraulic excavation, hydraulic sandblast perforation and hole cementation.

PRIOR ART

It has been known to use a safety valve comprising a hollow valve body with an inlet and an outlet communicating via a passage incorporating a valve seat closed by a shut-off member kinematically connected with a spring-load movable element accommodated in the valve body, with the active area of said movable element taking up the fluid pressure.

In the valve under discussion, the shut-off member is relieved of the load imposed by the adjusting spring and hence, when the valve comes into action, the shut-off member moves upwardly freely under the effect of hydrodynamic forces, fully opening the valve seat aperture and permitting the fluid to issue freely. This condition is of particular importance in handling fluids which contain abrasive matter, since the velocity of the fluid flow through the valve is sharply decreased due to the full opening of the valve with a consequent reduction of wear caused by the fluid flow in the valve parts.

The valve features stable operation inasmuch as its shut-off member is not loaded by the adjusting spring. Owing to this feature of the valve construction, the shut-off member of the valve does not oscillate during valve operation. When the valve comes into operation, the fluid pressure acts on a movable element which is essentially a hollow piston accommodating an adjusting spring and adapted to move in the valve body.

The piston is kinematically connected with the shut-off member. Therefore, when the piston moves under the effect of fluid pressure, with it unseats the shut-off member, the final opening of the valve being effected by the action of the hydrodynamic forces of the fluid.

The valve, the design of which is discussed above, is known to be intended for use in systems wherein fluid pressure is relatively low and the rate of fluid flow is also rather low. With this design, it is practically impossible to make a valve, the movable element of which would have a comparatively small active area, with the cross-sectional area of the valve seat passage being sufficiently large. This is attributed, in particular, to the fact that the active area of the movable element bears a quadratic relationship to the cross-sectional area of the valve seat passage, which necessitates the use of sufficiently strong adjusting springs and materially increases the weight and dimensions of the valve.

There are also known valves designed for use in systems employed in the high-pressure handling of fluids containing abrasive substances, for example, the valves produced by the U.S.A. firms "Kinzbach" and "Cameron".

These valves suffer from the disadvantage that they have an intricate construction and consume much labor in manufacture, and that they also have a considerable weight and overall dimensions, and, apart from this, are rather complicated to operate.

OBJECT AND SUMMARY OF THE INVENTION

It is an object of the present invention to provide a safety valve capable of operating over a sufficiently wide range of high pressures and rates of flow of fluids containing abrasive substances, which valve, having relatively small overall dimensions and light weight, will be dependable in operation and less labor-consuming to manufacture than the valves already known in the art.

The above and other objects are achieved in a safety valve designed for use in pipelines conveying fluid under pressure, which valve comprises a hollow valve body provided with an inlet and an outlet interconnected by a passage incorporating a valve seat closed by a shut-off member kinematically connected with a spring-loaded movable element accommodated in the valve body, with the active area of said movable element taking up fluid pressure.

According to the invention, the movable element is essentially a quantitatively variable set of plungers which are adapted to move on guides and the axes of which are spaced apart and positioned parallel with and equidistantly from the axis of the shut-off member, with the total area of the plunger end faces constituting the active area of the movable element.

The provision of a movable element constructed as described above enables the valve to be used at high fluid pressures, employing springs of comparatively reduced strength, which permits reducing the overall dimensions and weight of the valve and also makes it possible to eliminate the influence of the cross-sectional area of the valve seat passage on the active area of the movable element.

It is desirable that the plunger guides be provided in a bushing fixedly secured in the valve body and adapted to be replaced in order to meet changes in the fluid pressure range.

In one of the possible embodiments of the invention, a plugging element is placed in a plunger guide in order to place the associated plunger out of operation.

The construction of the safety valve which constitutes the present invention provides for decreasing or increasing the active area of the movable element by varying the number of the plungers employed therein.

In addition to the commonly adopted method of adjusting the valve pressure setting by changing the adjusting spring, the variation of the number of the plungers employed in the movable element permits increasing the range of use of each valve, whereby the need for various sizes of the valve is decreased.

Now the invention will be described in detail with reference to the accompanying drawings in which:

BRIEF DESCRIPTION OF THE DRAWINGS

FIG. 1 is a general view showing a longitudinal section taken through the safety valve, and FIG. 2 is a view taken along the line II—II of FIG. 1 the view looking in the direction of the arrows.

DETAILED DESCRIPTION OF THE INVENTION

The safety valve comprises a hollow valve body 1 with an inlet 2 and an outlet 3 which are interconnected by a passage 4 incorporating a seat 5 having an elastic seal 6 fixed therein. The valve seat 5 is closed by a shut-off member denoted generally 7 which is provided with a stem 8. Fixedly secured in the valve body 1 in line with the stem 8 is a bushing 9 which is mounted in such a manner that it can be easily replaced to meet changes in the fluid pressure range. The stem 8 passes centrally through the bushing 9. The end of the stem 8 extending from the bushing 9 has a shoulder which supports a washer 10 held in place by a nut 11 and a locknut 12.

The bushing 9 has a ring of through holes or bores extending parallel to the axis of the shut-off member 7, with the center of the ring of holes being in line with the axis of the bushing 9. Each of said through holes accommodates a plunger 13 adapted to reciprocate therein, with the walls of the holes forming guides 14 for the plungers. The set of plungers 13 serves as a movable element for taking up the pressure of the fluid.

Placed on end faces 15 (the top end faces as shown on the drawing) of the plungers 13 is a washer 16 which supports an adjusting spring 17. The total area of bottom end faces 18 of the plungers constitutes the active area of the movable element.

The spring 17, the top end of which bears against a spring seat 19, is accommodated in a housing 20. The closed end of the housing 20 has a central hole which is threaded to receive a screw 21 provided for adjusting the spring 17. After adjusting the spring 17, the screw 21 is locked in position by means of a lock nut 22. The spring housing is attached to the valve body 1.

The number of the guides 14 in the changeable bushing 9 is determined by the required active area of the plunger bottom end faces 18 and, consequently, by the number of the plungers 13 to be accommodated in the guides 14. The valve can be adapted for operation at a different fluid pressure by merely changing the bushing 9 to another one accommodating a greater or lesser number of the plungers 13, whereby the active area of the movable element is altered accordingly. Thus, it is sufficient to reduce the active area of the movable element for the valve to operate at a higher fluid pressure without changing the spring 17.

Moreover, the construction of the valve permits placing a number of the plungers 13 out of operation without changing bushing 9. This is achieved by closing the appropriate guides 14 with plugs 23.

The safety valve which constitutes the present invention can also be used as a common shut-off valve. For this purpose it is provided with a mechanism for moving the shut-off member 7. This mechanism comprises a rod 24 which is screwed into the end of the stem 8 and is passed through the seat 19 of the spring 17, the screw 21 and an element 25 hinged to the housing 20. Fitted on the end of the rod 24 is a nut 26.

To enable the shut-off member to automatically return into the initial position after the operation of the valve, provision is made of an elastic spring 27 which is placed about the rod 24 and bears against the seat 19 of the spring 17 at one end and against the washer 10 at the other end.

To enable the valve to be opened manually, the element 25 is provided with a side hole 28 to receive a hand lever (not shown on the drawing).

To enable the valve to be thoroughly flushed, particularly after handling quickly setting substances such as cement mortar, a flushing liquid exhaust hole (not shown on the drawing) may be provided in the valve coaxially with the inlet 3.

The effective area F of the movable element in the valve which constitutes the present invention is expressed by the formula:

$F = \pi/4 \ (nd^2 + d_1^2 - d_2^2)$ in which $d$ = plunger diameter,
$d_1$ = diameter of the shut-off member stem,
$d_2$ = valve seat diameter,
$n$ = number of the plungers.

As can be seen from the above formula, the valve under consideration can be made with the effective area of the movable element as small as necessary, whereby the tension of the adjusting spring 17 is diminished and the setting of the valve for operation at high fluid pressure is facilitated.

If the valve is constructed with the shut-off member 7 having a zero active area, as may be the case with a shut-off member of the piston type, the effective area of the movable element is equal to the active area of the plungers:

$F_1 = n \ \pi d^2/4$

As can be seen from the formulae given above, the effective area of the movable element does not depend on the cross-sectional area of the valve seat passage and therefore, unlike the valves known hitherto, the valve constructed in accordance with the present invention can practically handle any rate of flow, with the dimensions of the valve being kept to a minimum.

The valve operates as follows:

The fluid enters the valve body 1 under pressure. As long as the pressure is normal, the shut-off valve 7 is tightly held to the valve seat 5 by the spring 27, with the plungers 13 occupying the lowermost position due to the action of the adjusting spring 17. When the fluid pressure has built up to the setting of the spring 17, the plungers 13 start moving upwardly against the load of the spring 17. On the upstroke of the plungers 13, their top end faces 15 abut against the washer 10. As the plungers 13 travel further, they carry therewith the shut-off member 7, lifting it off the seat 5. The fluid passes into the gap between the end face of the shut-off member 7 and the seat and the hydrodynamic action of the fluid stream causes the shut-off member 7 to lift into the uppermost position, thereby compressing the spring 27 and fully opening the way for the passage of the fluid.

The fluid flows through the valve until its pressure drops down to normal, and then the shut-off member 7 is returned into the initial position by the spring 27. The plungers 13 are also brought into the lowermost position by the spring 17.

Fluid pressure can also be released by opening the valve manually. For the purpose a hand lever (not shown on the drawing) should be inserted into the side hole 28 in the element 25. The movement of the hand lever is transmitted by the rod 24 to the shut-off member 7, whereby the valve is opened or closed. The valve is operated in the same way when used as a shut-off valve.

The dimensions of the valve constructed in accordance with the present invention can be kept to a minimum practically at any cross-sectional area of the valve seat passage and, consequently, at any rate of fluid flow, said dimensions are determined in the main by the active area of the movable element.

What is claimed is:

1. A safety valve designed for use in pipelines conveying fluid under pressure, comprising a hollow valve body provided with an inlet and an outlet; means defining a fluid passage via which said inlet and outlet communicate; a valve seat incorporated in said fluid passage; a shut-off member closing said valve seat; a quantitatively variable set of plungers, the axes of which are spaced apart and positioned parallel with and equidistantly from the axis of the shut-off member; a single spring means loading said set of plungers; guides for said plungers to allow said plungers to reciprocate therein; a set of said plungers serving as a movable element kinematically connected with said shut-off member; and the total area of the end faces of a set of said plungers constituting the active area of the movable element.

2. The safety valve as claimed in claim 1, in which the plunger guides are provided in a bushing secured in the valve body, said bushing being replaceable in order to meet changes in the fluid pressure range.

3. The safety valve as claimed in claim 1, in which, to meet changes in the fluid pressure range, a plunger can be placed out of operation by placing a plug in its guide.

* * * * *